July 1, 1930.   J. GOWEN   1,768,596
HOLDER FOR REINS AND THE LIKE
Filed Oct. 31, 1929
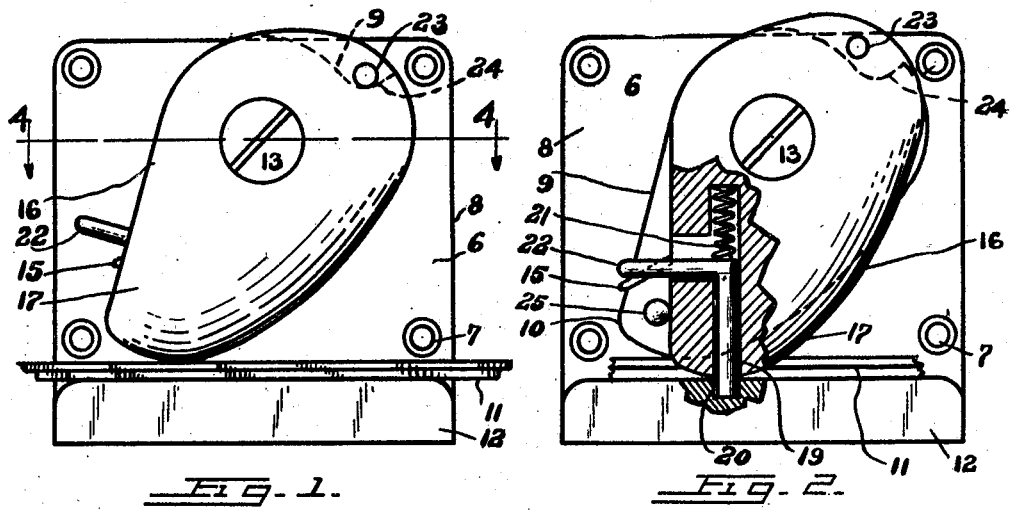
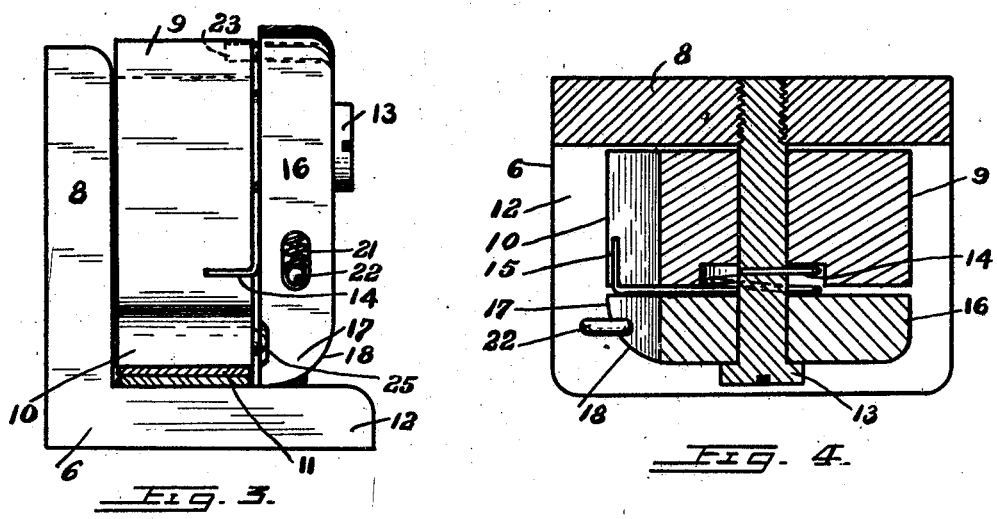
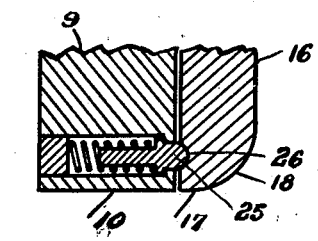
INVENTOR:
JOHN GOWEN
By Frederick E. Bromley
Attorney Patented July 1, 1930

1,768,596

UNITED STATES PATENT OFFICE

JOHN GOWEN, OF CORBYVILLE, ONTARIO, CANADA

HOLDER FOR REINS AND THE LIKE

Application filed October 31, 1929. Serial No. 403,894.

The invention relates to improvements in holders for reins and the like as described in the present specification and shown in the accompanying drawings which form part of the same.

The aim of the present invention is to produce a holder particularly devised with a view to attachment to a horse-drawn vehicle in order to hold the reins, although it is capable of various other uses, such as for instance tethering a horse or mooring a small vessel, such as a small boat or barge.

The invention mainly comprises a bracket bearing a spring-pressed cam for wedging the reins or other flexible element against a part of the bracket. A safety arm is also borne by this bracket which is capable of being locked to prevent side draft from freeing the reins, the locking preferably being accomplished by a bolt. A spring catch is provided to secure the locking device to the cam when they are in register one with the other so as to facilitate insertion and removal of the reins.

Referring to the accompanying drawings, Figure 1 is a side elevation of the invention depicting the cam gripping a pair of reins and the locking device raised in register therewith.

Figure 2 is a side elevation of the invention depicting the bracket and part of the locking device in section in order to disclose the securing bolt. In this view the locking device is shown in its locked position.

Figure 3 is a right-hand elevation of Figure 2.

Figure 4 is a sectional plan taken on the line 4—4 of Figure 1.

Figure 5 is a sectional detail of the catch.

Like numerals of reference indicate corresponding parts in each of the figures throughout the drawings.

In the drawings, the reference numeral 6 generally denotes the bracket which is preferably L-shaped as shown and pierced as at 7 to receive fastening elements such as screws or bolts for securing it to a supporting member. These openings may be omitted, however, if so desired and the bracket secured in any other convenient manner.

Pivoted to the upright member 8 of the bracket is a cam 9 which has a rounded off nose 10 wedging the reins 11 or other flexible element against the horizontal leg 12 of the bracket. The pivot may take the form of a screw as at 13 or it may be constructed in any other suitable manner. The cam is spring-urged into a wedging position against the reins by means of a torsional spring 14 having one end fitted in the screw 13 and the other end 15 bent over the cam.

16 is the locking device which is also pivotally secured on the screw 13. This locking device has a nose 17 corresponding in profile to that of the cam and has its outer face rounded off as at 18 in order to facilitate inserting the reins thereunder as later explained in detail.

19 is a bolt for securing the locking device in an upright position as depicted in Figure 2. This bolt is slidably mounted in the locking device for engagement in a recess 20 provided in the leg 12 of the bracket, a spring 21 being provided to urge it into automatic engagement with the recess, while the handle 22 provides for its being disengaged therefrom.

23 is a projection in the form of a pin projecting from the inner side of the locking device so as to lie in the path of a shoulder 24 formed on the cam so as to limit the forward movement of the cam when the locking device is in an upright position.

25 is a spring-urged catch mounted in the nose of the cam for engagement in an indent 26 in the locking device. The catch and the indent are so relatively positioned that they engage only when the locking device is brought into register with the cam.

In the use of this invention; the locking device and cam are brought into register with each other so as to allow the catch 25 to engage in the recess 26; then the reins or other flexible elements are inserted in the rounded off face 18 of the locking device, slightly raising it. The cam being secured by the catch to the locking device is also raised permitting the reins to slide thereunder; whereupon the locking device is forwardly turned to an upright position and there locked by the bolt. By this arrangement the reins cannot be forced from under the cam. The pressure of the spring wedges the reins firmly against the leg 12.

To remove the reins from the device it is merely necessary to release the bolt 19 and slightly raise the locking device until it is brought into register with the cam and there secured by the catch 25. The reins can then be freely drawn from under the cam and locking device.

What I claim is:—

1. A device of the class described comprising a bracket, a spring-urged cam pivoted thereto, said cam having a rounded off nose for wedging a flexible element against a surface of the bracket, and a locking device disposed to one side of the cam to preclude lateral dislodgment of the flexible element.

2. A device of the class described comprising an L-shaped bracket, a spring-urged cam pivoted to one of the legs thereof, said cam having a rounded off nose for wedging a flexible element against the other leg of the bracket, and a swingable locking device disposed to one side of the cam to preclude lateral dislodgment of the flexible element.

3. A device of the class described comprising an L-shaped bracket, a spring-urged cam pivoted to one of the legs thereof, said cam having a rounded off nose for wedging a flexible element against the other leg of the bracket, a locking device concentrically pivoted at the outer side of the cam to preclude lateral displacement of the flexible element, and a bolt for securing the locking device against turning.

4. A device of the class described comprising an L-shaped bracket, a spring-urged cam pivoted to one of the legs thereof, said cam having a rounded off nose for wedging a flexible element against the other leg of the bracket, a locking device concentrically pivoted at the outer side of the cam to preclude lateral displacement of the flexible element, means for securing the locking device against turning, and a catch for yieldably securing the cam to the locking device when in register with each other.

5. A device of the class described comprising an L-shaped bracket, a spring-urged cam pivoted to one of the legs thereof, said cam having a rounded off nose for wedging a flexible element against the other leg of the bracket, a locking device concentrically pivoted at the outer side of the cam to preclude lateral displacement of the flexible element, a spring-urged bolt borne by the locking device for engaging a recess in the bracket, and a spring catch for yieldably securing the cam to the locking device when in register with each other.

6. A device of the class described comprising an L-shaped bracket, a spring-urged cam pivoted to one of the legs thereof, said cam having a rounded off nose for wedging a flexible element against the other leg of the bracket, a locking device concentrically pivoted at the outer side of the cam to preclude lateral displacement of the flexible element, means for securing the locking device against turning, a shoulder formed on the cam, and a projection borne by the locking device for abutment with said shoulder to limit the forward turning movement of the cam.

Signed at Belleville, Ontario, Canada, the 19th day of October, 1929.

JOHN GOWEN.